UNITED STATES PATENT OFFICE.

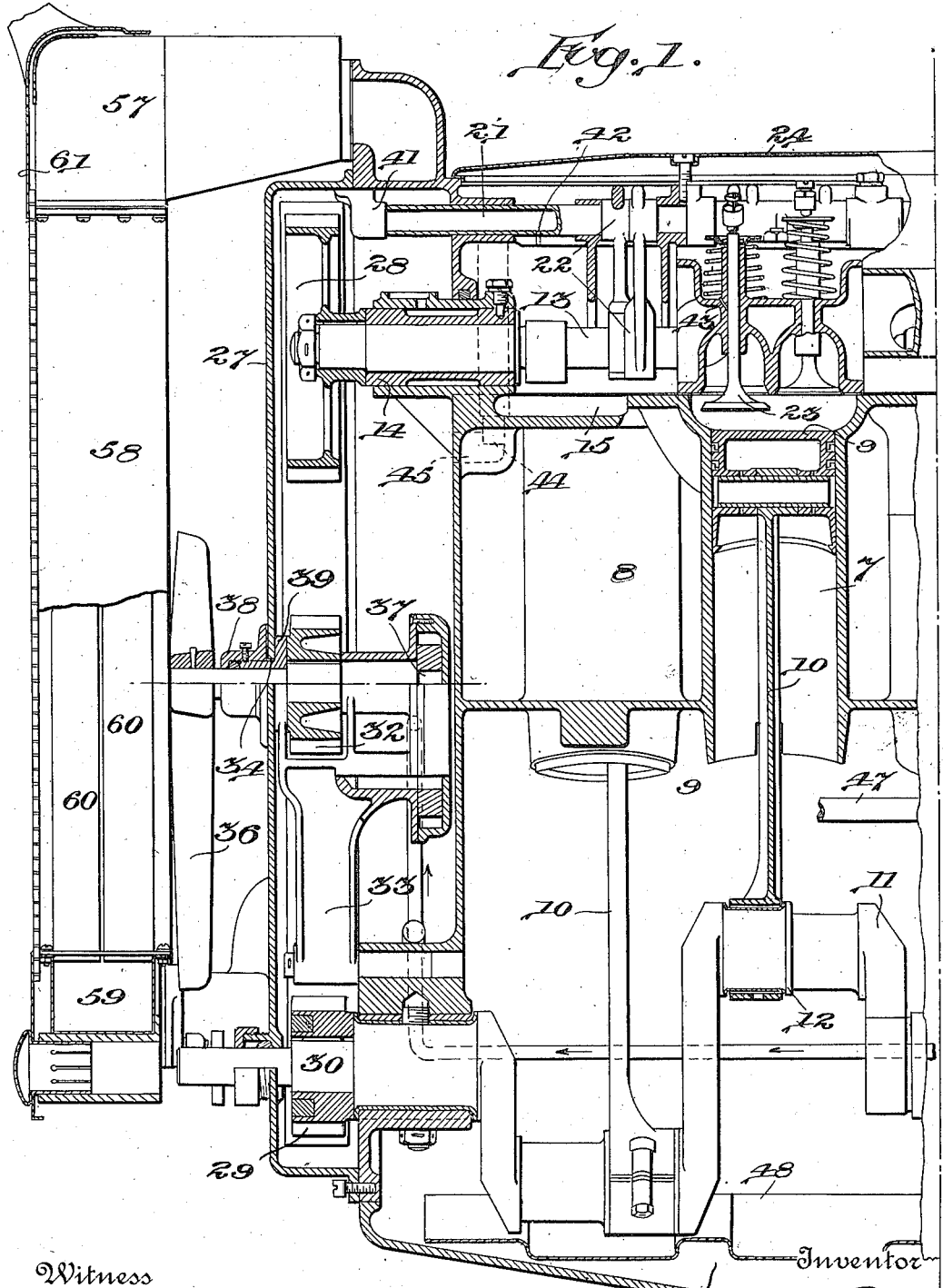

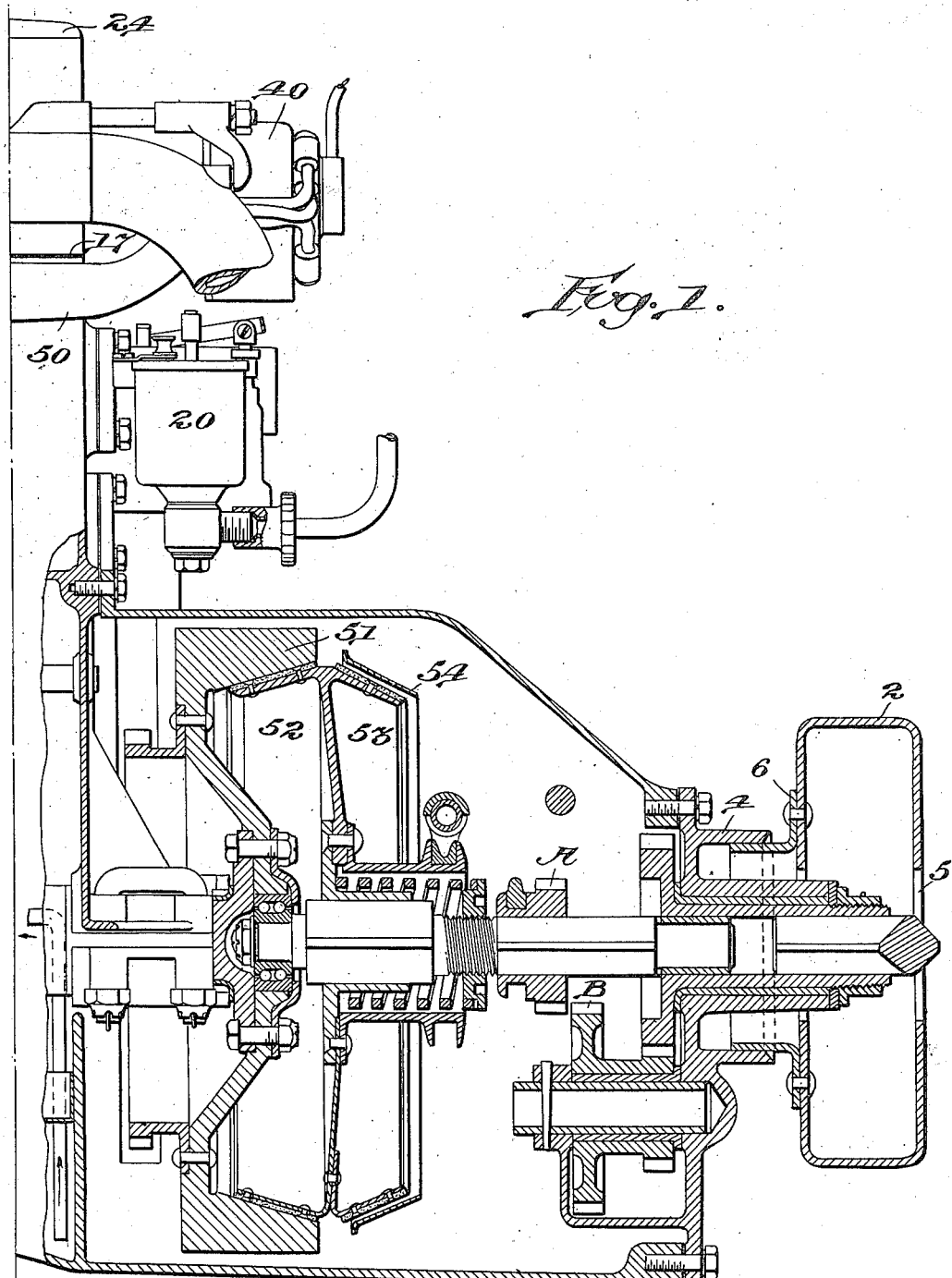

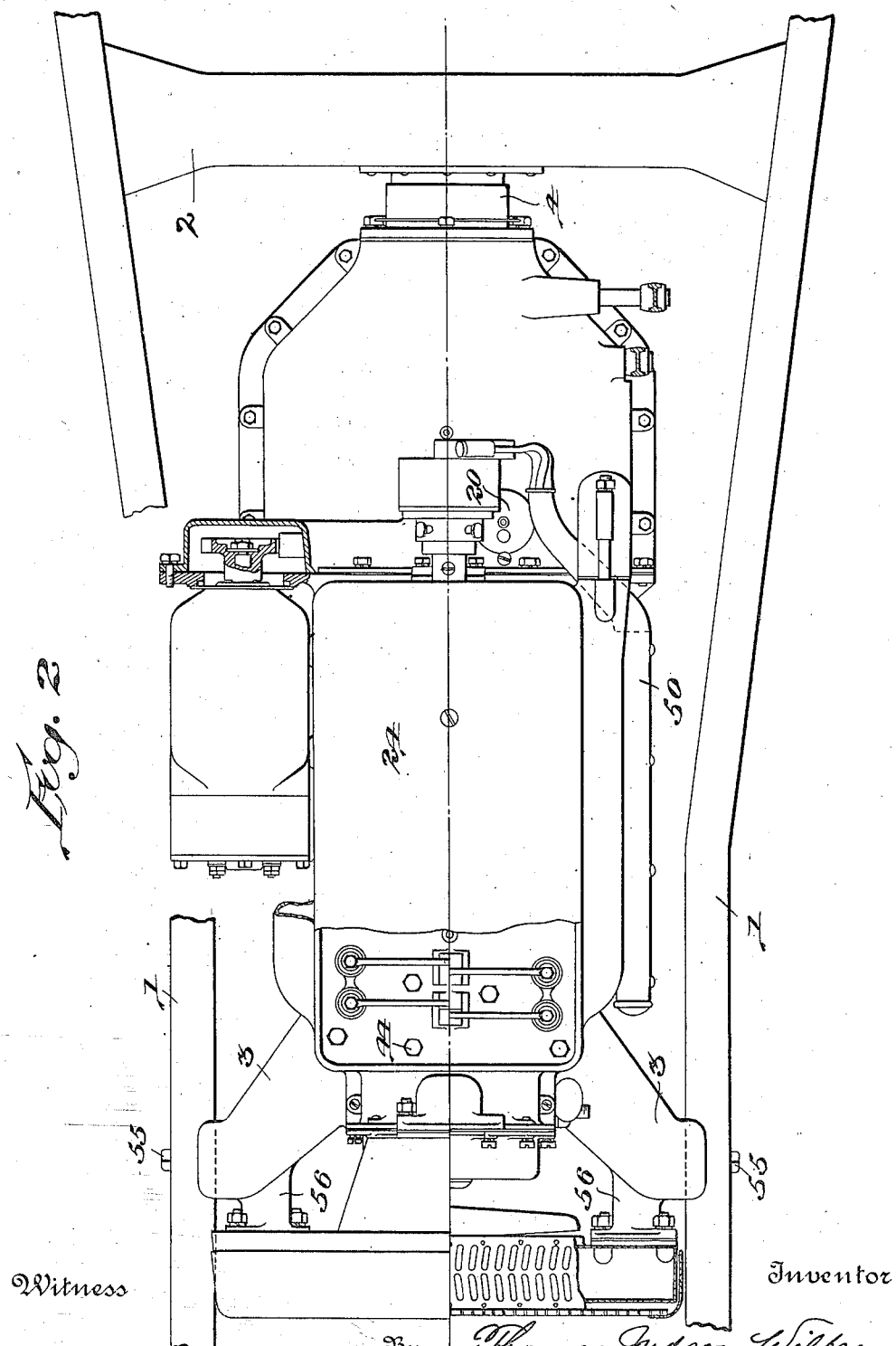

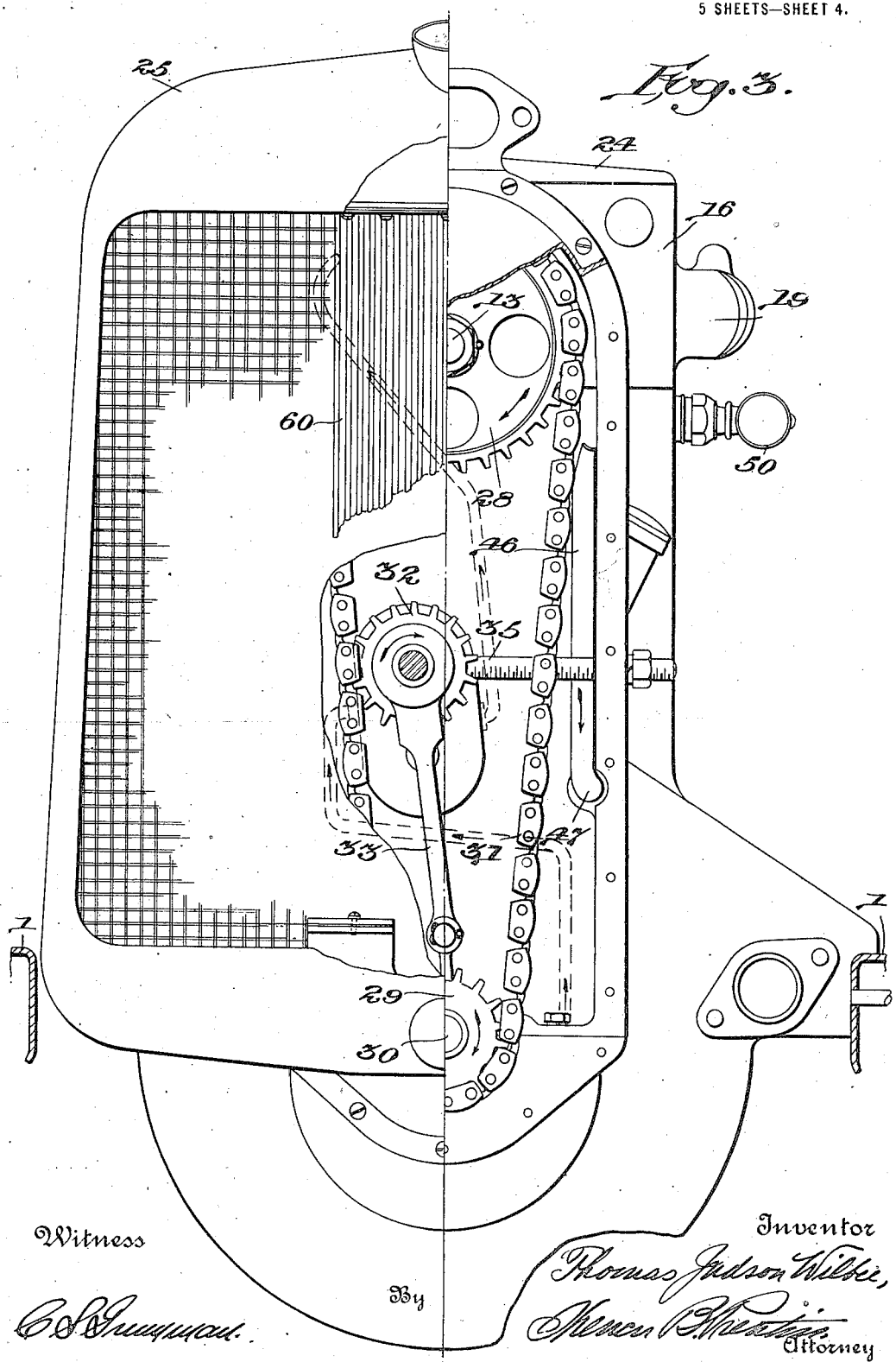

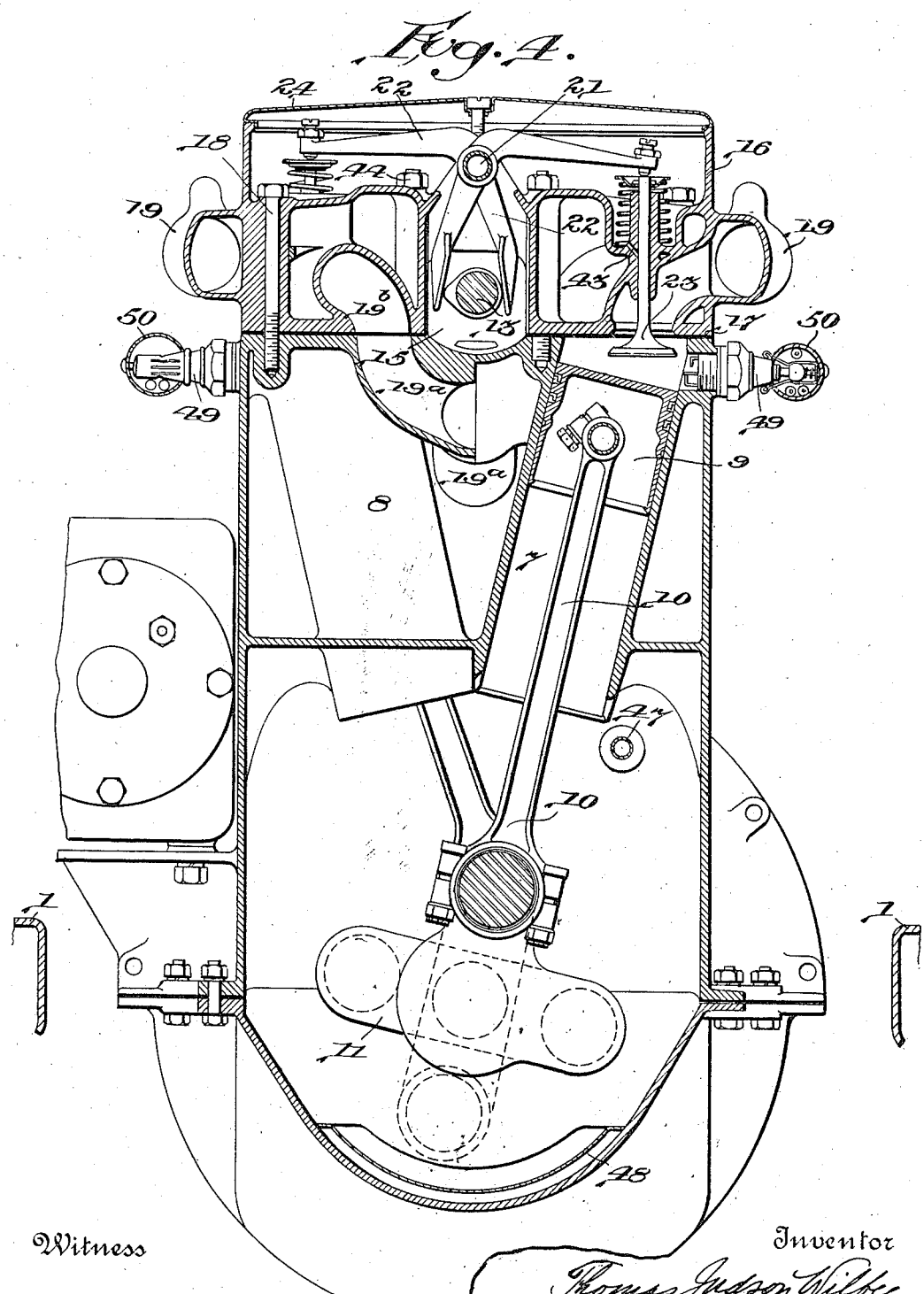

THOMAS JUDSON WILBEE, OF BUFFALO, NEW YORK, ASSIGNOR OF ONE-HALF TO ROBERT F. SHEPARD, OF PROVIDENCE, RHODE ISLAND.

INTERNAL-COMBUSTION ENGINE.

1,293,279.   Specification of Letters Patent.   Patented Feb. 4, 1919.

Application filed October 11, 1915. Serial No. 55,281.

*To all whom it may concern:*

Be it known that I, THOMAS JUDSON WILBEE, a citizen of the United States, residing at Buffalo, in the county of Erie and State of New York, have invented new and useful Improvements in Internal-Combustion Engines, of which the following is a specification.

My invention relates to internal combustion engines in general and in certain respects particularly to internal combustion engines of the V-type.

One object of the invention is to provide an engine of the V-type designed to occupy a minimum amount of space.

Another object is to provide efficient and novel lubrication means for the engine, the peculiar design of engine combining with the lubrication system to effect an unusually compact and simple machine.

Another object of the invention is to provide a new and compact cooling system for the engine forming an integral part of and mounted on the motor.

Another object of the invention is to provide a new adaptation of the three-point suspension principle to my new internal combustion engine.

These and other features of the invention consist of the novel construction and arrangement of parts together with the specific operation, and will be more fully described and set forth in the following specification and claims and illustrated in the accompanying drawings, in which—

Figure 1 represents (in two sheets) a longitudinal vertical section through a V-type motor of the eight-cylinder variety, a portion being broken away. This figure shows the relation between the cooling system, the fan therefor, together with the lubrication system, combined clutch and brake mechanism, and simple two speed and reverse transmission, with the three-point suspension principle embodied in the bearing member at the rear of the transmission housing.

Fig. 2 shows a top plan view of my eight-cylinder V-type motor, showing the three-point mounting.

Fig. 3 is a front vertical view of the engine and cooling system, the radiator being broken away to disclose the drive chain for the cam shaft and its relation to the idler gear wheel which operates the fan and oil pump.

Fig. 4 represents a vertical section through Fig. 1, showing the relative position of the cam shaft in the oil reservoir at the top of the cylinders and the relation between the cylinder head and valve mechanism to the cylinders on either side of the V.

Like numerals refer to like parts in the drawings.

Referring to the drawings, 1 represents the horizontal frame member at the side of the motor, 2 the cross frame section at the rear of the motor, 3 represents the lateral arms on either side of the motor resting on the frame member 1, and 4 is a circular flange projection extending rearwardly from the clutch and clutch brake housing toward the cross frame member 2. This member 2 is enlarged midway between the side frames 1 and has an opening 5 therethrough through which the propeller shaft extends. A member 6, circular in design, is fastened to the cross member 2 and arranged to receive the member 4 and support the weight of the motor, the member 6 registering in alinement with the opening 5 and slipping into the flange 4 to provide a bearing surface for any slight movement of the engine with respect to the cross frame member 2. The forward lateral arm at either side of the motor is securely fastened to the frame 1.

One of the features of the invention is the design of the engine which is shown as an eight-cylinder V-type motor. It has been found that the general practice in the construction of eight-cylinder motors of the V-type the cylinders on either side of the V must be disposed at an angle of 90°. This has occasioned the use of a wide frame and hood to receive the lateral width of the motor, and has necessarily curtailed the important feature of the short turn for the front wheels of automobiles when the engine has been used in connection with motor vehicles. The valve mechanism and intake manifolds, together with certain parts of the ignitions systems, have been placed within the V in these motors of the 90° type for the obvious reason that no space was left below the cylinders at either side thereof. The mounting of the parts mentioned within the angle of the V necessarily has caused great inconvenience by blocking access to the valves.

Contrasted to this bulky design of the 90° motor, my invention provides an eight-cylinder motor with the angle between the cylinders of considerably less than 90°. Combined with this important feature my invention provides a single cylinder head to cover the cylinders on either side of the V angle. This is of great importance as it includes the various manifolds for both intake and exhaust ports together with the valve mechanism, all of which ports being absolutely separate and independent from the cylinders proper.

7 and 8 refer to the cylinders on the right and left hand side of the motor looking toward the rear. 9 represents the pistons, 10 the connecting rods, 11 the crank shaft which is provided with two bearings of the four throw type, the throws being at 90° to each other. The crank pins are provided with spacing collars 12 in the center to strengthen the pin and separate the connecting rods 10. It will be observed that this arrangement makes it necessary to have the cylinders lightly staggered with respect to each other, the connecting rods being designed at their juncture with the crank pins so that they pass in relatively close proximity to each other.

Located at the top of the cylinders within the angle of the V is the cam shaft 13 extending lengthwise of the cylinders and mounted in suitable bearings 14. Surrounding the cam shaft and running the length of the cylinders is an oil reservoir 15 the bottom of which is slightly elevated at the rear end, as shown in the drawings. The cylinder head, bridging the angle of the V, is made of a single one-piece block 16, preferably of simple cast construction. The lower face of this cylinder head is formed with a plane surface 17 designed to rest on the corresponding plane surface of the tops of the cylinders, the joint being sealed by a gasket, and is secured to the latter by suitable bolts 18. Formed integrally with the cylinder head 16 and comprising a part thereof are the manifolds 19 for the exhaust ports. The intake manifold 19$^a$ is cast in the cylinder block and runs lengthwise thereof between the two rows of cylinders, this construction allowing the manifold to be entirely surrounded by the hot water which in turn heats the intake gas, thereby producing a higher combustible mixture, the carbureter 20 being situated at the rear end of the engine casting. This latter feature provides a short gasolene line in event that the engine be used in an automobile having the gasolene tank in the cowl. The manifold 19$^a$ branches off at two points, as illustrated in Fig. 4, two pipes coming up from either side to coincide with four similar ports in the bottom surface of the cylinder head, as illustrated in Fig. 4 by 19$^b$. When the gas reaches the cylinder head through 19$^a$ and 19$^b$ it branches off and is conducted through separate passages, not illustrated, into the combustion chamber through the inlet valves. It will be observed as in Fig. 4 that the exhaust is conducted directly past the valve into the manifold 19 and that the passageway is short and direct.

Mounted in bearings machined in the cylinder head casting 16 is a rocker shaft 21 which may be inserted from either end of the casting. This shaft is formed of tubular material to provide passageway for lubricant as will be hereinafter more fully described. Freely mounted on said rocker shaft are the rocker arms 22, arranged to operate the valves on the opposite cylinders. The valves 23 have their springs and adjusting mechanism mounted at the upper side of the cylinder head where they are easily adjustable. Valve set screws and lock nuts therefor are provided in the ends of each of the rocker arms. A dust plate or cover 24 covers the entire top of the cylinder head and effectively muffles any noise and excludes any dust and prevents the passage of any oil which may be splashed above the valve mechanism. As illustrated in Figs. 1 and 4, it will be observed that the cam shaft 13 in its reservoir 15 lies between the valves for the cylinders of either side of the V and that the space around the valve mechanism and rocker shaft extends unobstructed down to the bottom of the reservoir 15. The cam surfaces on the cam shaft are arranged to throw the rocker arms with but a slight movement, this movement being accentuated at the valve rod end of the rocker arm.

Mounted on the front of the motor and rigidly attached thereto so that the weight is carried by the engine itself is a radiator 25 to provide cooling surface for the cooling system which is shown herein as of the thermo-siphon variety. This feature is quite different from that of the ordinary internal combustion engine cooling system in which the radiator and water reservoir is mounted on the frame supporting the engine and is not carried directly by the motor. As used in automobile construction the advantage may be readily understood in dispensing with the ordinary leaky hose connections necessary where the radiator is mounted on the frame and flexible connections must be used to take up movement between the engine and the frame. This construction also helps to make it a simple task to remove the unit, it only being necessary to remove the two bolts 55, disconnect the two exhaust pipes and gasolene pipe. In the present instance the connections between the radiator 25 and the cylinders or main engine casting is through the medium of a positive pipe connection with the usual flanged faces bolted together on the customary gasket.

The detail construction of the radiator is one of the features of the invention and will be understood from the following description. The radiator is made in three sections, 57, 58 and 59, a fiber gasket sealing the two joints. The upper section is merely a reservoir which receives the heated water from the cylinder and distributes it through the vertical tubes of the main and middle section. It also has a flange on the rear surface that bolts to a similar flange on the cylinder through which the water passes. It is also the upper supporting means for the radiator. The middle section is composed of two rows of vertical tubes 60 which are elliptical in section, and are set at a slight angle so that the air will strike directly on two sides, giving a greater cooling area. The middle section is also composed of a frame on two plates, one on top and one on the bottom, with holes or openings cut in to receive the ends of the tubes, the joints of the tubes being sealed by solder. The feature of this construction is that if at any time a tube should leak from freezing or other causes, it can readily be removed and another inserted in its place by simply running a soldering iron around the ends and unsealing from the plate and the new one sealed the same way.

The lower section is a small reservoir which receives the water from the tubes and conveys it to the two pipes 56. There are two flanges on the rear of this section which bolt to two similar flanges or pipes 56 on the motor. This lower section carries the bearing for the starting crank shaft. Small screws fasten the section together. Over the front tops and sides is a sheet metal cover 61, giving the whole a smooth appearance of a regular radiator, the front of course being perforated to admit the air to the tubes.

The transmission is of a two speed forward and reverse type, the shifting of gears being done by a foot pedal. Starting with neutral, a slight movement ahead with the pedal throws in first gear and a further movement throws in high gear. There is a leather strap on the pedal over the toe by which the pedal can be pulled back to neutral and a further pull will throw in reverse. Reverse is possible by an idler gear which is on an arm which is hung from a pivot on upper half of case and swings into mesh with gears A and B while in their present neutral position. By removing plate or casting 4 the transmission can all practically be taken out and it just remains to take the cover off to take out the reverse idler.

Referring again to the cam shaft 13 and its operation, it will be observed that at the forward end of the engine and between the cylinders proper and the radiator is a casing 27. This extends practically over the whole front end of the cylinder casting and contains the sprocket wheel 28 mounted on the forward end of the cam shaft to drive the latter, the gear wheel or sprocket 29 mounted on the crank shaft extension 30 and the chain 31 arranged to drive the sprocket 28 from the sprocket 29, power being furnished the latter as the crank shaft revolves. The casing 27 also contains an idler gear wheel 32 which is spaced from the gear wheel 29 by supporting brace 33. It will be observed that a large opening 34 in the front of the casing 27 allows movement of the shaft of the idler gear wheel 32 either to the right or left as the set screw 35 adjusts the idler gear 32 to take up slack in the chain 31. The shaft of the idler gear 32 extends through the same in front to provide supporting means for the fan 36 and in the rear to provide a shaft as drive means for the oil gear pump 37, the operation of which latter will be presently described. The cap 38 on the outside of the casing is arranged to co-act with a member 39 on the inside of the same and to clamp the casing 27 between them so as to insure a positive grip on the casing and prevent any leakage of oil through the opening 34. A suitable set screw is provided to fasten the member 38 with respect to the member 39.

At the rear end of the cam shaft 13 my invention provides for the direct mounting thereon of the ignition distributer 40, which arrangement provides for the accessibility of the latter and a positive drive therefor, a feature greatly to be desired inasmuch as gear connections and the resultant inaccuracies in timing can be avoided.

The lubrication of the engine will be understood from the following description. The gear pump 37 is connected to the oil sump at the bottom of the crank case by means of suitable piping. When the engine is running the gear pump draws oil from the sump and discharges it by means of suitable piping over the chain 31 near the top thereof and just before the latter passes the funnel 41, see Figs. 1 and 3. Oil not taken off by this funnel 41 or the funnel 46 is carried down to the distributing oil reservoir in the housing provided by the casing 27. As the cam shaft revolves, the silent chain 31 carries with it oil to the topmost part of the casing and the centrifugal force discharges a certain amount of oil into a funnel-like opening 41 located at the forward end of the tubular rocker shaft and projecting over the gear 28 and the chain. The oil flows down through the tubular rocker shaft 21 along the same, distributing oil to the rocker arms through various openings which are provided in the rocker shaft as required to properly lubricate these moving parts. Other openings 42 in the rocker shaft allow the oil to drop down onto the cam shaft from which it drains into the reservoir 15. The oil running from the rocker shaft down over the rocker arms supplies lubrication to the valve rods. Any excess of oil accumulating in the valve spring seats is drawn into the cylinders through the drilled hole 43. This provides lubrication for the intake valve rod and is a feature greatly to be desired in all internal combustion engines inasmuch as the intake of gas cuts the oil which might be found in these moving parts, causing unnecessary wear of the valve stems. The outlet valve stem may be provided with a similar oil duct if it be desirable.

The reservoir 15 has its bottom formed in the main casting for the cylinders near the top thereof and in the angle between the cylinders, as has previously been described. The side walls of the reservoir are formed by the cylinder head, the reservoir being complete when the head is attached to the cylinders. Oil draining or otherwise passing from the rocker shaft accumulates in the reservoir 15 and the oil level there is maintained by suitable overflow pipes at either end of the reservoir, not shown in the drawing. These pipes conduct the oil to the oil sump at the bottom of the crank case. When it is necessary to remove the cylinder head from the main cylinder casting it is necessary to drain the oil from the reservoir. This is accomplished by means of the bolt 44 which constitutes a fastening bolt similar to those indicated by the numeral 18. This bolt extends down into an opening 45 leading from the lowest point of the reservoir. When this bolt is withdrawn to remove the head, the opening 45 is uncovered and the oil passes from the cam shaft reservoir 15 into the front oil reservoir within the casing 27.

Lubrication for the connecting rods is positively established by the arrangement of the following parts. As the chain 31 passes downward from the cam shaft gear 28 oil is taken off by a funnel 46 located at one side of the casing. From this funnel the oil is conducted down and back in the pipe 47 horizontally past the connecting rod and sprayed by gravity out on the latter through openings drilled in the member 47. This oil drains down into the oil sump at the bottom of the crank case, from which point it is pumped back into the main reservoir within the casing 27.

A suitable plate 48 is provided within the crank case to catch the oil dripping from the connecting rods and establish means to provide a fixed amount of oil immediately adjacent the crank shaft when the throws are at their lowermost position. Oil draining from the connecting rods and from the overflow pipes of the cam shaft reservoir flows to this plate 48, fills depressions in the same, and runs over into the oil sump at the bottom of the crank case. It will be observed that this member 48 prevents undue splashing of the oil upwardly when the engine should be subjected to running in positions not on the horizontal, as is often the case in the use of automobile motors.

The ignition from a supply which may be provided after passing through the distributer 40 is conducted to the spark plugs 49 on either side of the cylinder rows through the medium of a mechanism which is one of the features of my engine. A tube 50 is provided with four snap openings to engage the outer ends of the spark plugs to provide a positive attachment of the terminal wires; the terminal cables extend through the tube 50 which is sufficiently long to engage all the plugs on one side of the motor. By this means a positive connection is made in all four cylinders by the mere pressure of the tube 50 against the spark plugs.

Another feature of the invention is the new type of double cone clutch and brake which forms a part of my transmission assembly. The fly wheel 51 provided as usual with a clutch 52 is in this instance illustrated as a cone clutch. The rear side of the clutch member is provided with a similar cone surface 53 arranged to engage a fixed member 54. Suitable control means, not shown, is provided for operating this clutch. As the clutch is disengaged and the movement continued rearwardly the face 53 engages with the fixed member 54 providing a positive braking action. In combination with this feature the transmission assembly includes gear mechanism which has been previously described.

From the foregoing it will be observed that this engine provides a new and compact type of the multi-cylinder motor of the V-type combined with an arrangement of parts completing a valve-in-head motor with a single unitary head for all of the cylinders on both sides of the V. Accessibility of parts is provided for by the simplicity of the castings and the unusually small amount of machining to be done. The dust cap, removed by a few screws, gives instant accessibility to the valve mechanism and the removal of the head may be accomplished without interfering with the cam shaft which is mounted in bearings on the cylinder casting and without interfering in any way with the timing of the engine, the distributer being fastened to the end of the cam shaft.

When the head is removed, the rocker shaft may be withdrawn by sliding forward, the rocker arms falling into their relative positions to either side of the cam shaft and being easily threaded back on the rocker shaft when it is reinserted. The arrangement of the valves in the head allows for grinding of the valves in their seats without removal of the former from the cylinder head. When the head is removed for grinding of the valves or otherwise cleaning the parts the entire cylinder head may be immersed in gasolene or other cleaning fluid without need of changing the valve adjustments.

One of the most important features resides in the unitary arrangement of the engine and radiator. In contrast to the present custom in which the radiator is not mounted on the motor, especially in automobiles, the present invention makes it possible to lift the engine and radiator bodily as a unit free from the frame or running gear. By this arrangement great saving of time and money may be brought about in initial assembly and in repair work.

What I claim is:

1. In an internal combustion engine of the V-type, cylinders on either side of the V, an oil reservoir in the angle of the V between said cylinders adjacent their upper ends, a cam shaft in said reservoir mounted on said cylinders, and a single unitary head for said cylinders on either side of said V, bridging the same and mounted above said cam shaft, said unitary cylinder head containing valves for said cylinders and valve gear therefor to be operated by said cam shaft.

2. In an internal combustion engine of the V-type, cylinders on either side of the V, a cam shaft mounted on said cylinders in the angle of the V between said cylinders and adjacent their upper ends, and a single detachable unitary head for said cylinders on either side of said V, bridging the same and mounted above said cam shaft, said unitary cylinder head containing valves for said cylinders, a rocker shaft and valve gear therefor to be operated by said cam shaft, said cylinder head, rocker shaft and valve gear being removable as a unit without disturbing said cam shaft on said cylinders.

3. In an internal combustion engine of the V type, cylinders on either side of the V, a cam shaft mounted on said cylinders in the angle of the V between said cylinders and adjacent their upper ends, and a single detachable unitary head for said cylinders on either side of said V, bridging the same and mounted above said cam shaft, said unitary cylinder head containing valves for said cylinders, a rocker shaft and valve gear therefor to be operated by said cam shaft, said valve gear being adapted to engage said cam shaft when the cylinder head is attached to said cylinders and being subject to withdrawal from said cam shaft without disturbing the latter when the head is removed.

4. In an internal combustion engine of the valve in head type, cylinders for said engine, a cam shaft mounted on said cylinders adjacent their upper ends, and a single detachable head for said cylinders mounted above said cam shaft, said detachable head containing valves for said cylinders, a rocker shaft, and valve gear therefor to be operated by said cam shaft, said cylinder head, rocker shaft and valve gear being removable as a unit without disturbing said cam shaft on said cylinders.

5. In an internal combustion engine of the V-type, cylinders set off the perpendicular an oil reservoir between said cylinders adjacent their upper ends, a cam shaft mounted upon said cylinders between the same and said oil reservoir, a single unitary cylinder head for said cylinders on either side of said V, bridging the same and said cylinders and mounted above said cam shaft, valve mechanism mounted within said cylinder head arranged to co-act with said cam shaft, and a hollow rocker shaft within said head, said rocker shaft being arranged to convey lubricant and distribute the same over said valve mechanism and said cam shaft.

6. An internal combustion engine of the V-type having a single unitary head for the cylinders on either side of the V, valve mechanism, valves, and a hollow rocker shaft in said head, said hollow rocker shaft comprising means to convey lubricant and distribute the same over said valve mechanism.

7. In an internal combustion engine of the V-type, an oil reservoir between the cylinders and adjacent their upper ends, a cam shaft mounted upon said cylinder in the V and in said oil reservoir, a single unitary cylinder head for the cylinders on either side of the V bridging the same and mounted above said cam shaft, valve mechanism mounted within said head arranged to co-act with said cam shaft, a hollow rocker shaft within said head for distributing lubricant to said valve mechanism and to said cam shaft, a main crank shaft, and a chain driven by said crank shaft to turn said cam shaft, said chain constituting conveying means for elevating lubricant to said rocker shaft.

8. In an internal combustion engine of the valve-in-head type, a plurality of cylinders, an oil reservoir adjacent the top of the cylinders, a cam shaft arranged to rotate in the said reservoir, a single cylinder head for all the cylinders, valve mechanism in said head, a hollow rocker shaft within said head, a main crank shaft, and a chain driven by said crank shaft arranged to turn said cam shaft and constituting positive elevating means for conveying lubricant to said hollow rocker shaft, the lubricant being distributed thereby to said valve mechanism and oil reservoir containing said cam shaft.

9. In an internal combustion engine of the V-type, a row of cylinders on either side of said V, and a single intake manifold for the passage of combustible gases formed integrally with the cylinders and located between the same within the V.

10. In an internal combustion engine of the V type, a row of cylinders on either side of said V, and a single intake manifold for the passage of combustible gases formed integrally with the cylinders and located between the same within the V and extending substantially the length of the rows of cylinders.

11. In an internal combustion engine of the V type, cylinders on either side of the V, an oil reservoir in the angle of the V between said cylinders adjacent their upper ends, and an intake manifold for the passage of combustible gases formed integrally with the cylinders and located between the same and beneath said oil reservoir and substantially the length of the latter.

12. In an internal combustion engine of the V type, a row of cylinders on either side of said V, a cam shaft located adjacent the upper ends of said cylinders and in said V, a detachable cylinder head mounted above said cam shaft, and an ignition distributer mounted on one end of said cam shaft, said head being removable from said cylinders without disturbing said cam shaft and distributer.

13. In an internal combustion engine of the V type, a row of cylinders on either side of the V, an oil reservoir in the angle of the V between said cylinders adjacent their upper ends, a cam shaft in said reservoir mounted on said cylinders, and a single unitary head for said cylinders on either side of said V, bridging the same and mounted above said cam shaft, said unitary cylinder head containing valves for said cylinders and valve gear therefor to be operated by said cam shaft, the bottom floor of said reservoir being formed in one piece with said cylinders and the side walls for said reservoir being formed in one piece with said cylinder head.

14. In an internal combustion engine of the V type, a row of cylinders on either side of said V, a lower oil reservoir adjacent the lower end of said cylinders, an upper oil reservoir in the angle of the V between said cylinders and adjacent their upper ends, a communicating conduit connecting said reservoirs, and a bolt member extending into said conduit and constituting a closure therefor.

15. In an internal combustion engine of the V type, a row of cylinders on either side of said V, a lower oil reservoir adjacent the lower end of said cylinders, an upper oil reservoir in the angle of the V between said cylinders, and adjacent their upper ends, a communicating conduit connecting said reservoirs, a single unitary cylinder head extending over said upper reservoir and rows of cylinders, and a fastening member extending through said cylinder head into said conduit and constituting combined fastening means for holding said cylinder head on said cylinders and a closure for said conduit.

16. In an internal combustion engine of the V-type, cylinders on either side of the V, a cam shaft mounted on said cylinders in the angle of the V between said cylinders and adjacent their upper ends, an ignition distributer on one end of said cam shaft, and a single detachable unitary head for said cylinders on either side of said V, bridging the same and mounted above said cam shaft, said unitary cylinder head containing valves for said cylinders, a rocker shaft and valve gear therefor to be operated by said cam shaft, said unitary head and valve gear being detachable from said cylinders without disturbing said cam shaft and distributer.

17. In an internal combustion engine of the valve in head type, a plurality of cylinders, a cam shaft mounted on said cylinders adjacent their upper ends, an ignition distributer on one end of said cam shaft, and a single detachable head for said cylinders mounted above said cam shaft, said detachable head containing valves for said cylinders, a rocker shaft and valve gear to be operated by said cam shaft, said cylinder head, rocker shaft and valve gear being removable as a unit from said cylinders without disturbing said cam shaft and distributer.

18. In an internal combustion engine of the V-type, a cylinder casting providing a row of cylinders on each side of said V, and an intake manifold between the cylinders and in the angle of the V adjacent the upper ends of said cylinders, the width of said manifold being substantially the same as the distance between the cylinders, and the walls of the manifold being formed in one piece with the casting of the cylinders.

19. In an internal combustion engine of the V-type, a cylinder casting providing a row of cylinders on each side of said V, and an intake manifold between the cylinders and in the angle of the V adjacent the upper ends of said cylinders and extending the length of said casting, the width of said manifold being substantially the same as the distance between the cylinders, and the walls of the manifold being formed in one piece with the casting of the cylinders.

20. In an internal combustion engine of the V-type, a cylinder casting providing a row of water-jacketed cylinders on each side of said V, and an intake manifold in the angle of the V adjacent the upper ends of said cylinders, the width of said manifold being substantially the same as the distance between the cylinders, the walls of said manifold being formed in one piece with the casting of the cylinders and the bottom wall of said manifold being in the water-jacket space in the angle of the V.

21. In an internal combustion engine of the V-type, a cylinder casting providing a row of water-jacketed cylinders on each side of said V, and an intake manifold in the angle of the V adjacent the upper ends of said cylinders and extending the length of said casting, the width of said manifold being substantially the same as the distance between the cylinders, the walls of said manifold being formed in one piece with the casting of the cylinders and the bottom wall of said manifold being in the water-jacket space in the angle of the V.

22. In an internal combustion engine of the valve in head type, cylinders for said engine, a cam shaft mounted on said cylinders adjacent their upper ends, and a single detachable head for said cylinders mounted above said cam shaft, said detachable head containing valves for said cylinders, and valve gear therefor to be operated by said cam shaft, said cylinder head and valve gear being removable as a unit without disturbing said cam shaft on said cylinders.

In testimony whereof I have hereunto set my hand in presence of two subscribing witnesses.

THOMAS JUDSON WILBEE.

Witnesses:
M. MANNHEIMER,
ANTONY JANNUS.